(12) United States Patent
Che et al.

(10) Patent No.: US 7,773,336 B2
(45) Date of Patent: Aug. 10, 2010

(54) HARMONIC MEASUREMENT FOR HEAD-DISK SPACING CONTROL USING USER DATA

(75) Inventors: Carl Xiaodong Che, Saratoga, CA (US); Yawshing Tang, Saratoga, CA (US); Haejung Lee, Suwon (KR)

(73) Assignee: Samsung Electronics Company, Ltd., Suwon (KR)

( * ) Notice: Subject to any disclaimer, the term of this patent is extended or adjusted under 35 U.S.C. 154(b) by 0 days.

(21) Appl. No.: 12/323,367

(22) Filed: Nov. 25, 2008

(65) Prior Publication Data
US 2010/0128399 A1 May 27, 2010

(51) Int. Cl.
G11B 21/02 (2006.01)
(52) U.S. Cl. ........................................ 360/75
(58) Field of Classification Search .................. None
See application file for complete search history.

(56) References Cited
U.S. PATENT DOCUMENTS

| | | | | |
|---|---|---|---|---|
| 4,777,544 A * | 10/1988 | Brown et al. | | 360/75 |
| 5,301,080 A * | 4/1994 | Ottesen et al. | | 360/66 |
| 5,410,439 A * | 4/1995 | Egbert et al. | | 360/75 |
| 6,519,102 B1 * | 2/2003 | Smith et al. | | 360/31 |
| 6,765,745 B2 * | 7/2004 | Smith et al. | | 360/75 |
| 7,468,856 B2 * | 12/2008 | Fitzpatrick et al. | | 360/75 |
| 7,542,227 B2 * | 6/2009 | Che et al. | | 360/75 |

* cited by examiner

Primary Examiner—K. Wong
(74) Attorney, Agent, or Firm—Ben J. Yorks; Irell & Manella LLP

(57) ABSTRACT

A hard disk drive that determines a flying height from a ratio of a first harmonic transfer function and a third harmonic transfer function. The transfer functions can be determined from a response to an impulse function. The impulse function (also known as an impulse response) can be a playback waveform de-convolved by channel data sequence. Any change in the ratio of the first and third harmonic transfer functions corresponds to a change in the flying height. The disk drive may utilize the transfer function ratios in a feedback routine to control the flying height.

15 Claims, 5 Drawing Sheets

HARMONIC MEASUREMENT FOR HEAD-DISK SPACING CONTROL USING USER DATA

BACKGROUND OF THE INVENTION

1. Field of the Invention

The present invention relates to determining a flying height of a head in a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

HGA transducers include three primary elements: a reader sensor, a writer structure and a head protrusion control element, also known as fly-on-demand ("FOD"). The reader sensor is commonly made of a spin tunneling MR structure. The writer structure includes coils and magnetic flux path structure made with high permeability and high magnetization material. The head protrusion control element (FOD device) is typically constructed of a header coil. When a current is applied, the coil generates heat and causes the writer and reader elements to move closer to the media. The FOD device is used to dynamically set writer spacing and reader spacing to the disk surface during the operation of the disk drive. The calibration of such spacing is first done during an initialization process of the drive. The initialization process involves measuring head spacing changes while the reader is moved closer to the disk with activation of the FOD device. The FOD device moves the reader and writer closer to the disk until the H/M contact signal is detected. The FOD device can be set to put the writer and the reader at desirable spacing when the head/media ("H/M") contact point is the spacing reference (h=0).

During operation, each head is separated from a corresponding disk surface by an air bearing. The air bearing eliminates mechanical interference between the head and the disks. The FOD device is used to further set reader and writer positions above the disk surface, based on the pre-calibrated target. The strength of the magnetic field from the disk is inversely proportional (restrictly in a nonlinear fashion) to the height of the reader head spacing to the disk. Reduced spacing results in a stronger magnetic field on the disk, and vice versa.

The flying height of head (specially the flying height of the reader and writer) may vary during the operation of the drive. For example, a shock load on the drive may create a vibration that causes the heads to mechanically resonate. The vibration causes the heads to move toward and then away from the disk surfaces in an oscillating manner. Particles or scratch ridges in the disk may also cause oscillating movement of the heads. The oscillating movement may occur in either a vertical or in-plane direction relative to the flexure arm. Environment changes, such as temperature and altitude can also cause a change in the head flying height.

If oscillation of the heads occurs during a write routine of the drive, the resultant magnetic field from the writer on the disk will vary inversely relative to the flying height of the writer. The varying magnetic field strength may result in poor writing of data. Errors will occur when the signal is read back by the drive.

Knowing and controlling the flying heights of the heads is the critical for both disk drive reliability and data integrity. With the introduction of FOD technology, the disk drive can dynamically control head flying height. To accurately operate the FOD device and achieve the desirable writer and reader spacings to the disk, flying height measurement technique are developed. The most common technique is to use playback signal components in frequency domain, as shown as an example in the following file.

The FOD device can be used to adjust head flying height in real time. The relative flying change for a given FOD device condition can be accurately characterized. If the head flying height relative to a desirable target can be measured, the offset can then be compensated by proper fine tuning of the FOD device setting (adjust either current or voltage). The spacing error signal (SES) of a head is defined as an indicator of a spacing offset between an actual head position to a desirable head position. The concept of SES is very similar to a position error signal ("PES") of a disk drive servo system. One can view SES as the PES of head in the direction perpendicular to the disk surface.

There are various methods for creating spacing error signals ("SES") that are used to control the flying height through feedback schemes. Practical construction of spacing error signals ("SES") is limited by available electrical/mechanical signals and disk drive hardware capability. One type of SES is to use servo automatic gain control ("AGC") signal where a signal (AGC) embedded into a dedicated field of a servo sector is read and used to calculate SES in accordance with an AGC process. Servo AGC SES is susceptible to changes with temperature and may provide different results depending on whether the head is at the inner diameter or the outer diameter of the disk. There are also schemes to utilize an AGC that reads data from a data field of the track sector. Data AGC schemes are also susceptible to variations because of temperature. Finally, SESs can be generated by analyzing the 1st and 3rd harmonics, or ratio of harmonics, from an embedded signal(s) in a dedicated track. Such an approach requires a dedicated track that will reduce the data capacity of the drive. It would be desirable to generate and use SESs without the deficiencies noted for prior art schemes. The following table summarizes the existing schemes that are available for SES calculations:

| Type | Mechanism | | Pro/Cons |
|---|---|---|---|
| Servo AGC | AGC changes as H/M spacing changes | Available now | Change with Temperature |
| | | Multiple samples | ID to OD kfci changes |
| | | Any where | Very large variations |
| Data AGC | AGC changes with H/M spacing | Available now | Change with Temperature |
| | | Multiple samples | Data dependent |
| | | On data region | |

-continued

| Type | Mechanism | | Pro/Cons |
|---|---|---|---|
| Harmonic ($1^{st}/3^{rd}$) | Harmonic or ratio of harmonic change with H/M spacing | Available now Use resolution | Only work on dedicated tracks |

BRIEF SUMMARY OF THE INVENTION

A hard disk drive that determines a flying height from a ratio of a first harmonic transfer function and a third harmonic transfer function determined from a response to a impulse function.

DETAILED DESCRIPTION

Disclosed is a hard disk drive that determines a flying height from a ratio of a first harmonic transfer function and a third harmonic transfer function. The transfer functions can be determined from a response to an impulse function. The impulse function (also known as an impulse response) can be a playback waveform de-convolved by channel data sequence. Any change in the ratio of the first and third harmonic transfer functions corresponds to a change in the flying height. The disk drive may utilize the transfer function ratios in a feedback routine to control the flying height. Unlike first/third harmonic schemes of the prior art, the ratio of transfer functions can be performed on any data track and thus does not require a dedicated track. Additionally, by utilizing functions of the first/harmonics the controller of the disk drive is capable of processing the information without significant changes in programming.

Figure 1:
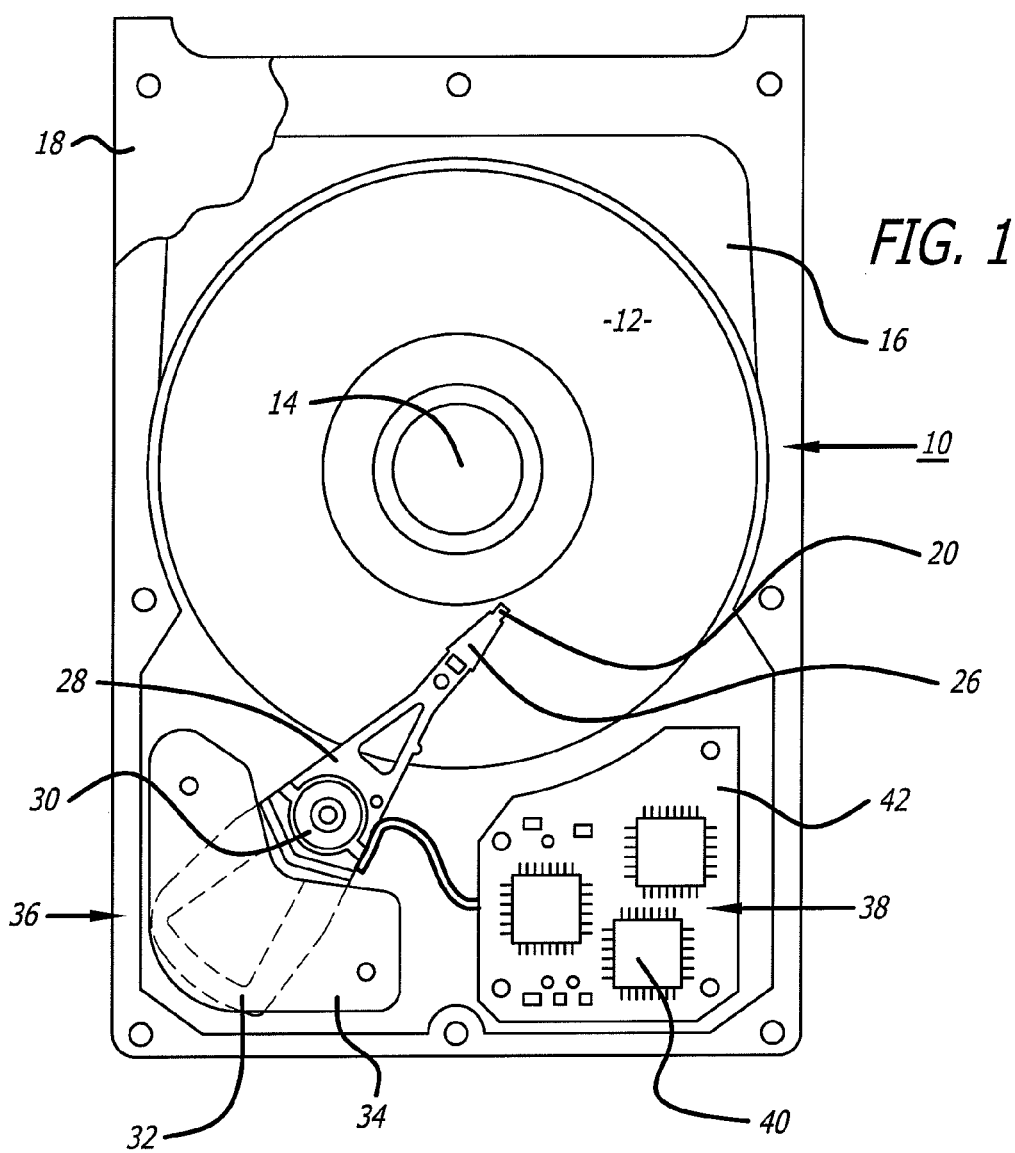
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
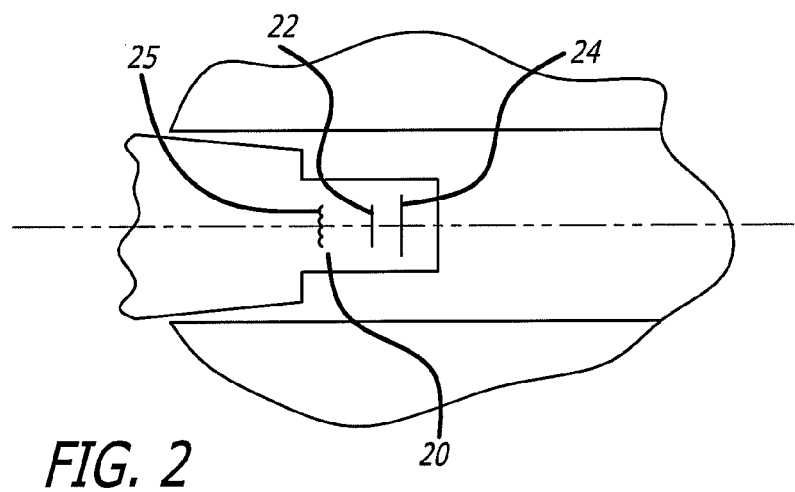
FIG. 2 is an illustration of a head of the disk drive.

The disk drive 10 may include a plurality of heads 20 located adjacent to the disks 12. As shown in FIG. 2 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux. Each head may include a heater element 25. A current can be provided to the heater elements to expand the heads and vary the head flying height. These types of heads are commonly referred to as fly-on-demand ("FOD") heads.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 3:
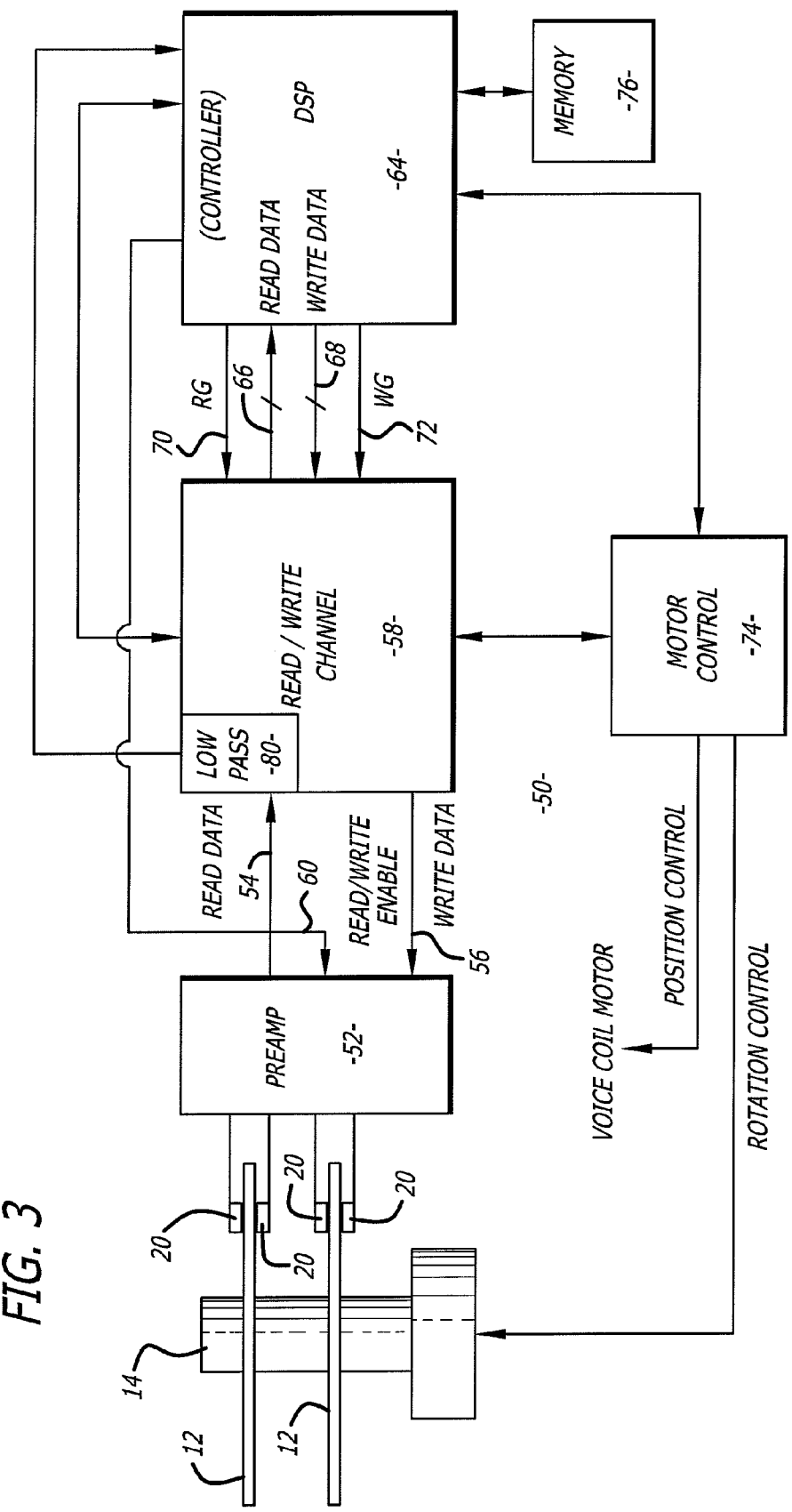
FIG. 3 is a schematic of an electrical circuit for the hard disk drive.

FIG. 3 shows an embodiment of an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

Figure 4A:
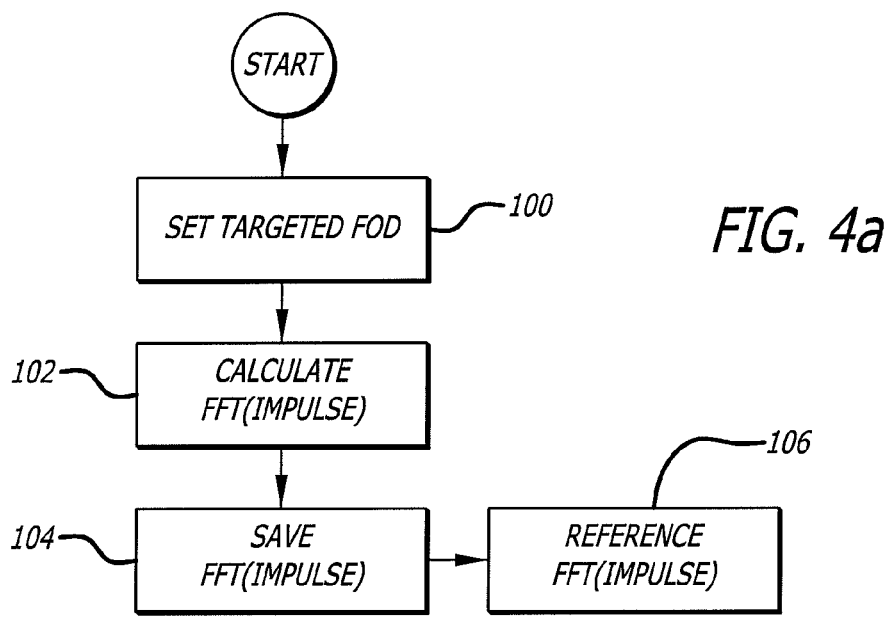
FIG. 4a-c are flow charts showing a process to control a flying height of a head.
Figure 4B:
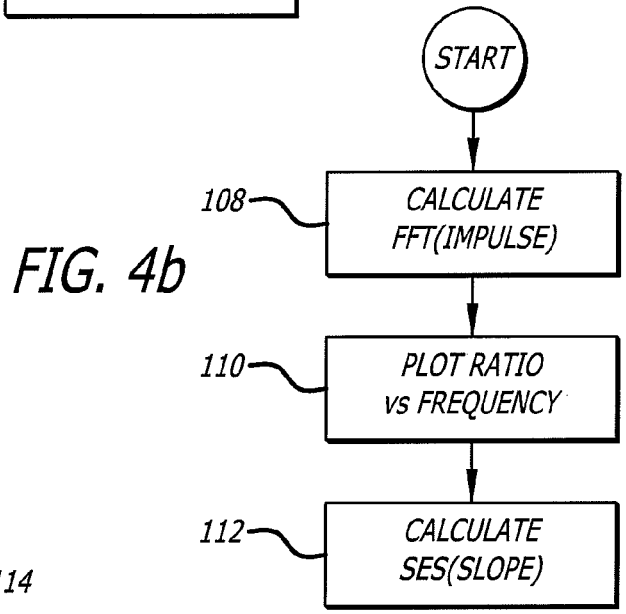
Figure 4C:
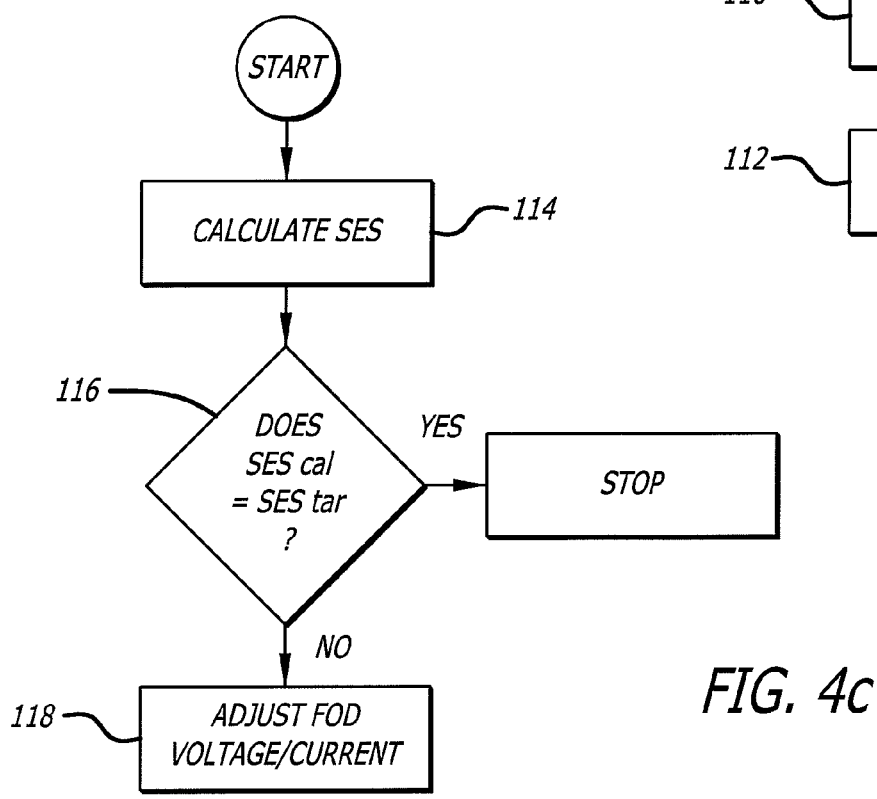

FIGS. 4a-c are flowcharts that describes processes used to control a flying height of the head during operation of the drive. The processes can be performed by the controller 64. FIG. 4a shows a process that is typically performed during a burn-in or calibration of the disk drive at a manufacturing/test facility. In step 100 a current is provided to the heater element of the head to create a target flying height. In step 102 a Fourier transform ("FFT") is performed on a response to a reference impulse. The Fourier transform will generate a frequency spectrum that includes one or more harmonic frequencies. The amplitudes of the harmonic frequencies are saved in step 104. The saved values can be stored on the disk and/or other non-volatile memory of the disk drive as a Ref_file in step 106.

FIG. 4b is a process that is performed during normal operation of the disk drive after burn-in and calibration. In step 108 a Fourier transform is performed on a response to a data impulse. The data impulse may be one or more magnetic data transitions within a data field of a disk track sector. The data impulse may therefore occur during the operation of the disk drive. There is no need for a dedicated sector or track of the disk. The Fourier transform generates a frequency spectrum that includes one or more harmonic frequencies.

Figure 5:
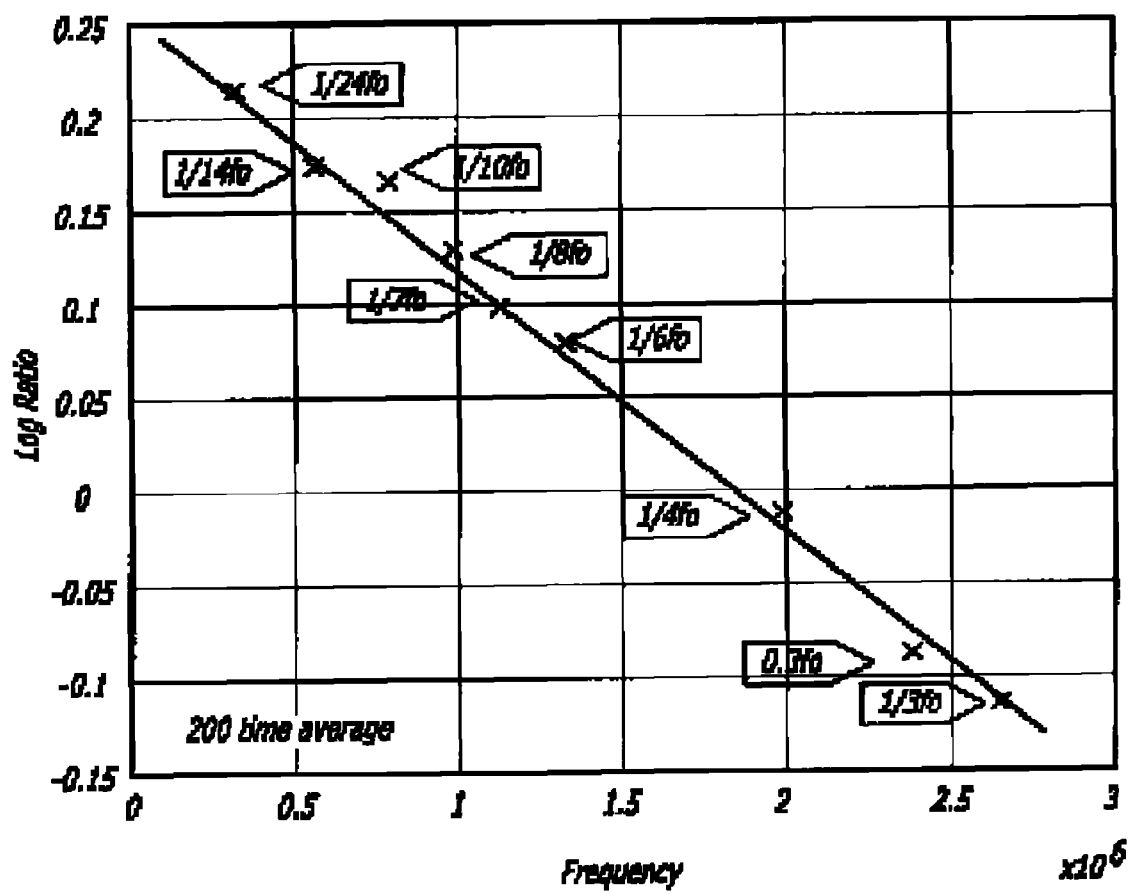
FIG. 5 is a plot of amplitude ratios versus frequency.

In step 110 a ratio of the amplitudes of the data frequencies divided by the amplitudes of the reference frequencies for each harmonic frequency is calculated and plotted as a function of frequency. For example, the amplitude of the harmonic frequency at 10 megahertz for the data impulse is divided by the amplitude of the harmonic frequency at 10 megahertz for the reference impulse. The amplitude of the harmonic frequency at 20 megahertz for the data impulse is divided by the amplitude of the harmonic frequency at 20 megahertz for the reference impulse and so forth and so on. FIG. 5 shows an example of the log ratios plotted as a function of frequency.

The slope of a line for the ratio data points is determined from the plot in step 112. The slope relates to the data in accordance with the following equation:

$$\ln\left\{\frac{FFT[\text{impulse\_response}(d1)]}{FFT[\text{impulse\_response}(d0)]}\right\} = \frac{-2\pi(d1-d0)}{v}f + C \quad (1)$$

where;

FFT[impulse_response(d1)]=the amplitude of the harmonic frequency for the data impulse.

FFT[impulse_response(d0)]=the amplitude of the harmonic frequency for the reference impulse.

f=frequency.

v=disk speed.

C=is a constant of the plotted line.

d0=is the flying height when the reference impulse is generated.

d1=is the flying height when the data impulse is generated.

The slope of the line is equal to d0-d1. The change in flying height can be calculated from equation (1) as d0-d1. The differential d0-d1 is the spacing error signal ("SES").

A slope can be generated for each track of the disk. Likewise, a slope can be generated for each sector within a track. The slope may be an average from multiple data impulses within a data sector. Additionally, the average may be time averaged. For example, Fourier transforms may be generated for the same data sector 200 times and the amplitude values used for the plot may be the average for the 200 samples.

The slopes can be stored and used in a feedback scheme to control the flying height. FIG. 4c shows such a process. An SES is calculated in step 114. The calculated SES is compared with a target SES value in step 116. If the calculated SES does not equal the target SES then the current to the heater element of the head is adjusted in step 118 and the process is repeated.

Figure 6:
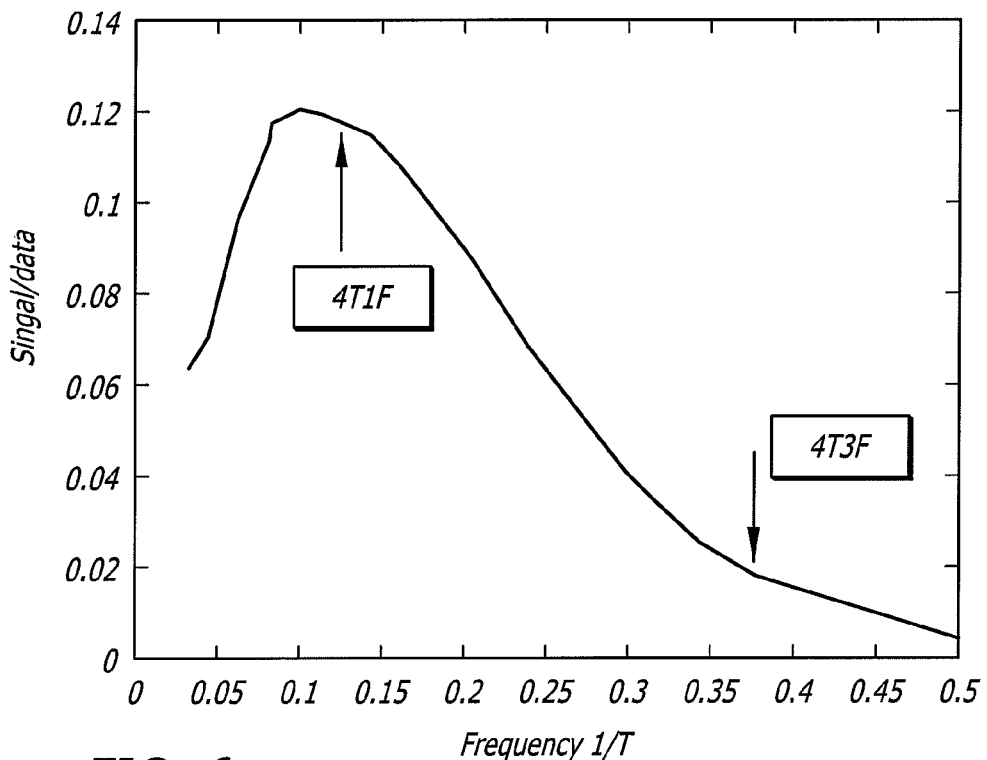
FIG. 6 is a Fourier transform of a signal generated in response to a impulse signal.

The flying height can also be determined from the transfer functions of the response to the data impulse at the first and third harmonics. A Fourier transform can be performed to represent the response signal as a function of frequency as shown in FIG. 6. Knowing the frequency of the data magnetic transitions, the first and third harmonics and corresponding signal amplitudes can be determined. A first harmonic transfer function can be determined from the amplitude of the response signal at the first harmonic and a third harmonic transfer function can be determined from the amplitude of the response signal at the third harmonic.

The ratio of the first and third harmonic transfer functions is proportional to the flying height of the head. A change in flying height will vary the ratio of the first/third harmonic transfer functions. Although only two transfer functions are needed to determine the flying height, the signal to noise ratio can be improved by also calculating transfer functions at other frequencies. The other transfer functions can be use in a curve fitting algorithm to provide a more accurate approximation of the response signal amplitude at the first and third harmonics.

Figure 7:
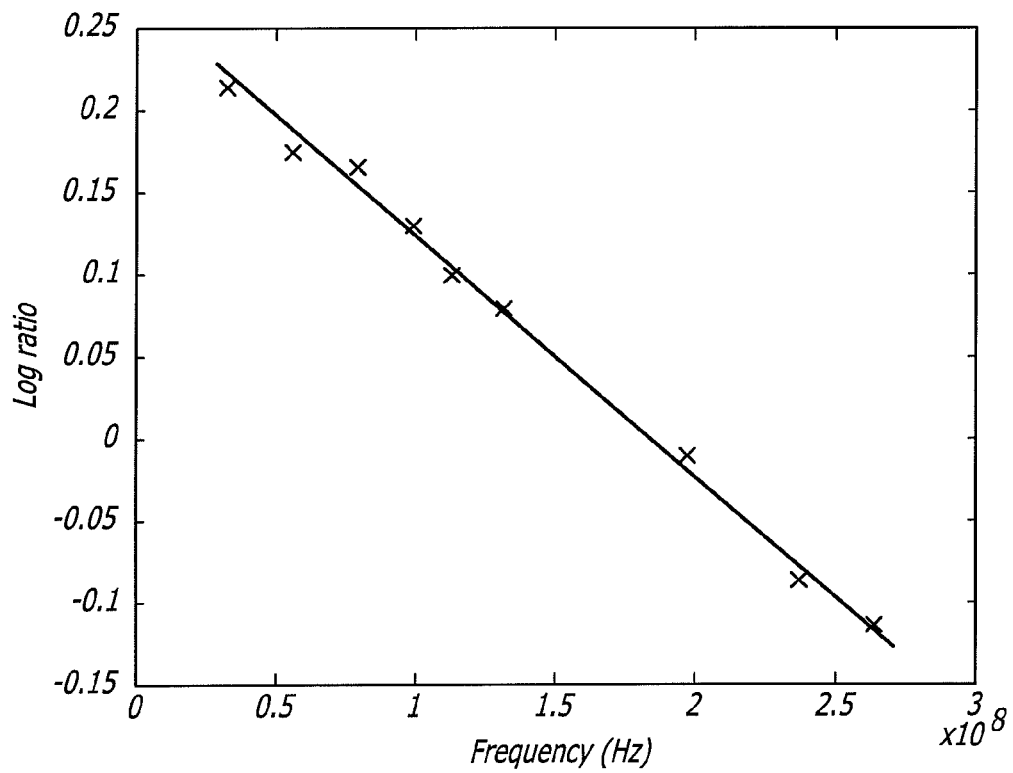
FIG. 7 is a plot of transfer function ratios as a function of frequency.

As shown in FIG. 7, for a fixed disk velocity the natural log of the ratios of two different transfer functions will plot as a straight line. The plotted values can be the ratios of the transfer functions for the response signal to the data impulse and transfer functions for the response to a reference signal. The first harmonic transfer function may be divided by a reference transfer function. Likewise, the third harmonic transfer function may be divided by the reference transfer function. The reference transfer functions can be determined at factory burn-in, etc. and are computed from a response to a reference impulse. Alternatively, the reference transfer functions can be based on a response to a data impulse at a different flying height. Once the line is plotted, the transfer function ratios at any frequency of interest can be determined. The transfers functions for the selected frequencies can be determined from the plotted ratios and used to determine the flying height of a head.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
a disk that contains a signal;
a spindle motor that rotates said disk;
a head that is coupled to said disk and has a flying height; and,
a controller that determines a variation in flying height from a ratio of a first harmonic transfer function and a third harmonic transfer function determined from a response to an impulse function, said transfer functions being defined as said responses divided by said impulse function.

2. The disk drive of claim 1, wherein said controller also utilizes transfer functions from other frequencies of said impulse function.

3. The disk drive of claim 1, wherein each transfer function is divided by a reference transfer function.

4. The disk drive of claim 1, wherein said ratio of transfer functions is used in a feedback routine to control said flying height.

5. The disk drive of claim 1, wherein said impulse function is a playback waveform from a plurality of isolated magnetic transitions in a data sector of said disk.

6. A hard disk drive, comprising:
a disk that contains a signal;
a spindle motor that rotates said disk;
a head that is coupled to said disk and has a flying height; and,
means for determining a variation in flying height from a ratio of a first harmonic transfer function and a third harmonic transfer function determined from a response to an impulse function, said transfer functions being defined as said responses divided by said impulse function.

7. The disk drive of claim 6, wherein said means also utilizes transfer functions from other frequencies of said impulse function.

8. The disk drive of claim 6, wherein each transfer function is divided by a reference transfer function.

9. The disk drive of claim 6, wherein said ratio of transfer functions is used in a feedback routine to control said flying height.

10. The disk drive of claim 6, wherein said impulse function is a playback waveform from a plurality of isolated magnetic transitions in a data sector of said disk.

11. A method for determining a flying height of head in a hard disk drive, comprising:
 determining a first harmonic transfer function and a third harmonic transfer function from a response to an impulse function; and,
 determining a variation in flying height of a head from the ratio of the first harmonic transfer function and the third harmonic data function, the transfer functions being defined as the responses divided by the impulse function.

12. The method of claim 11, further comprising determining transfer functions at other frequencies and utilizing the other transfer functions to determine the variation in flying height.

13. The method of claim 11, further comprising dividing the first harmonic transfer function and the third harmonic transfer function by a reference transfer function.

14. The method of claim 11, further comprising controlling the flying height using the ratio of the first harmonic transfer function and the third harmonic transfer function.

15. The method of claim 11, wherein the impulse function is a playback waveform from a plurality of isolated magnetic transitions in a data sector of the disk.

* * * * *